May 17, 1966  S. B. McNALLY  3,251,591
COMBINED ASSIST SPRING AND SHOCK ABSORBER UNIT
Filed May 18, 1964  7 Sheets-Sheet 1
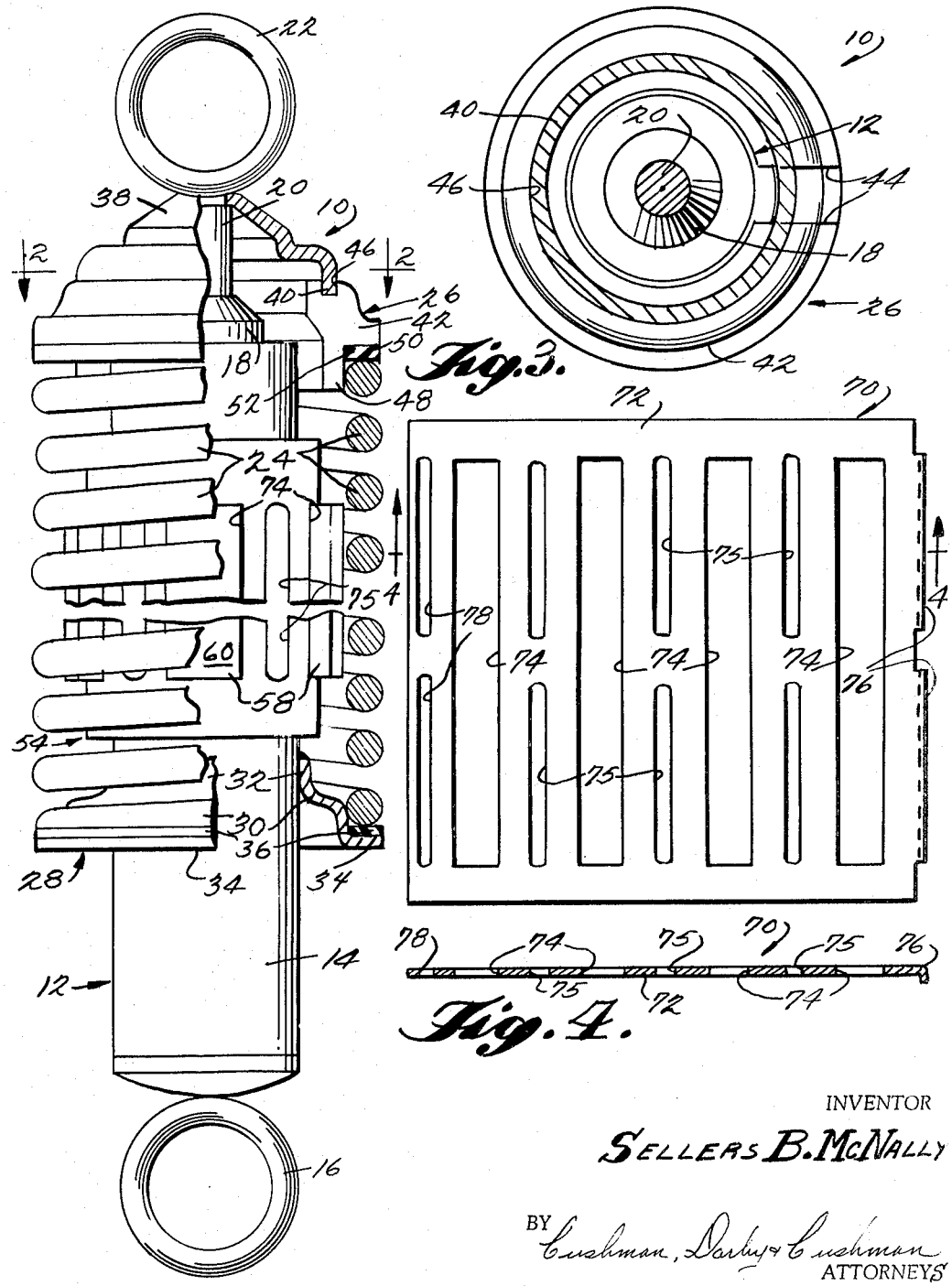
INVENTOR
SELLERS B. McNALLY
BY Cushman, Darby & Cushman
ATTORNEYS

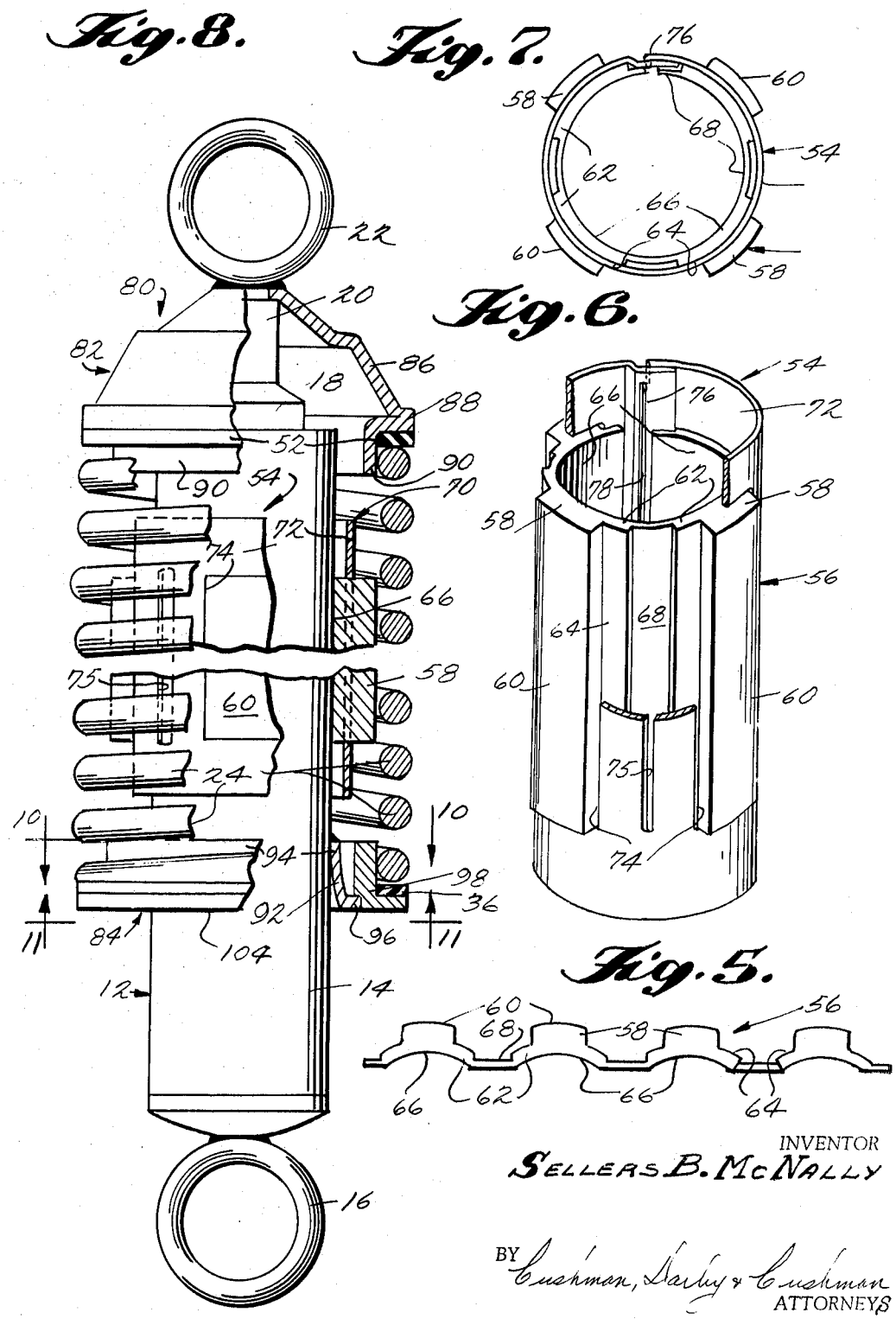

May 17, 1966  S. B. McNALLY  3,251,591
COMBINED ASSIST SPRING AND SHOCK ABSORBER UNIT
Filed May 18, 1964  7 Sheets-Sheet 3
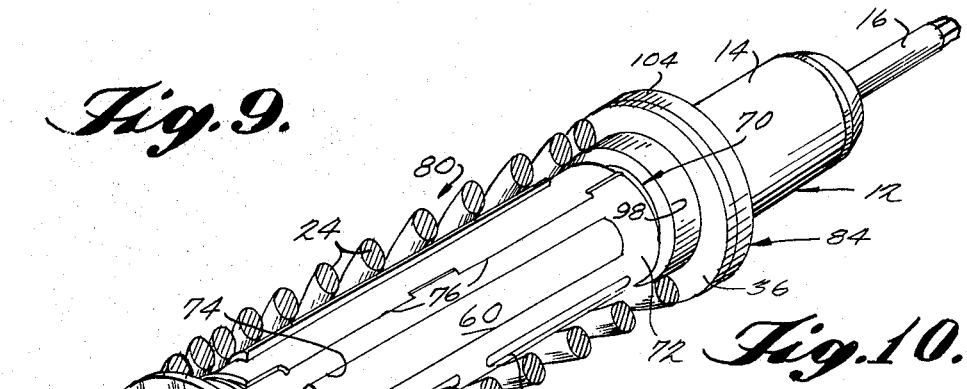
Fig. 9.
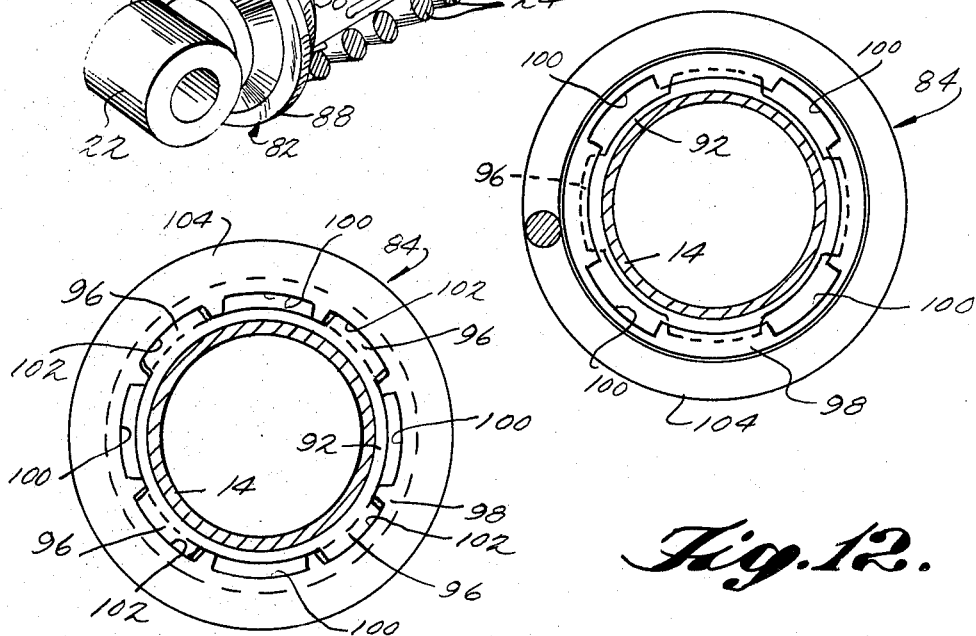
Fig. 10.
Fig. 11.
Fig. 12.
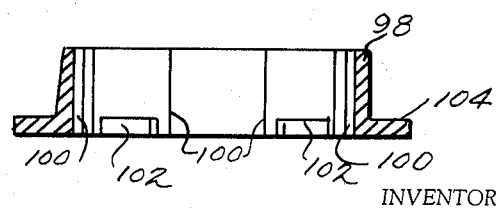
INVENTOR
SELLERS B. McNALLY
BY Cushman, Darby & Cushman
ATTORNEYS May 17, 1966 S. B. McNALLY 3,251,591
COMBINED ASSIST SPRING AND SHOCK ABSORBER UNIT
Filed May 18, 1964 7 Sheets-Sheet 4
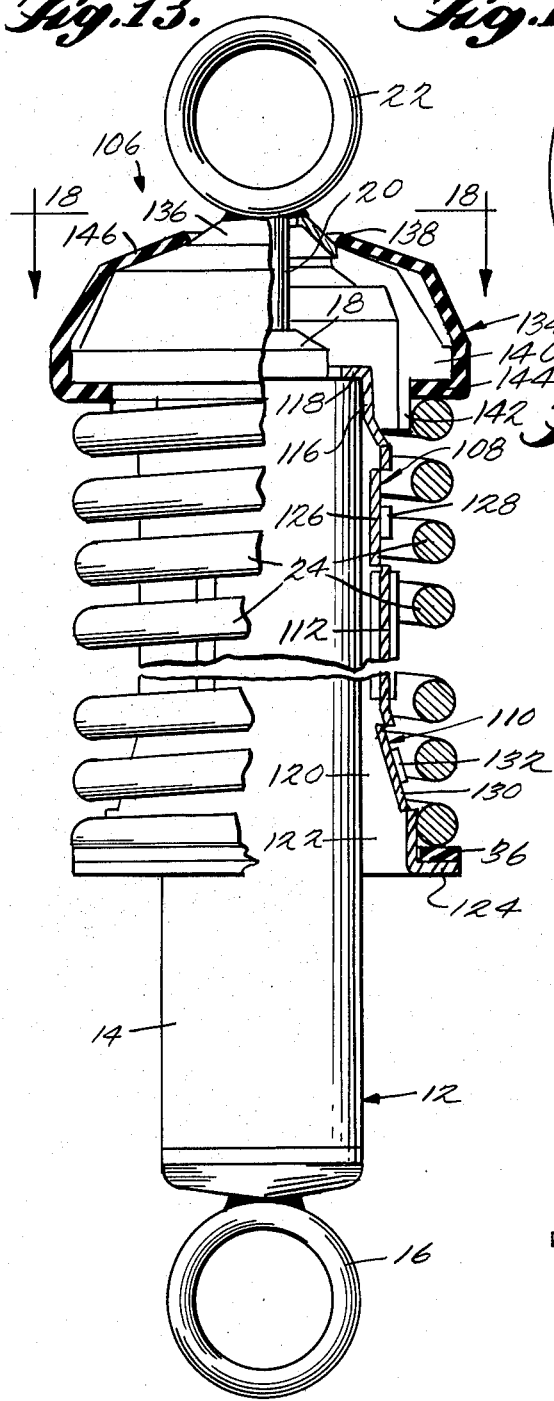
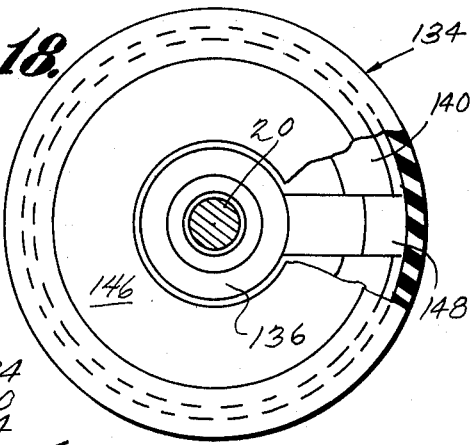
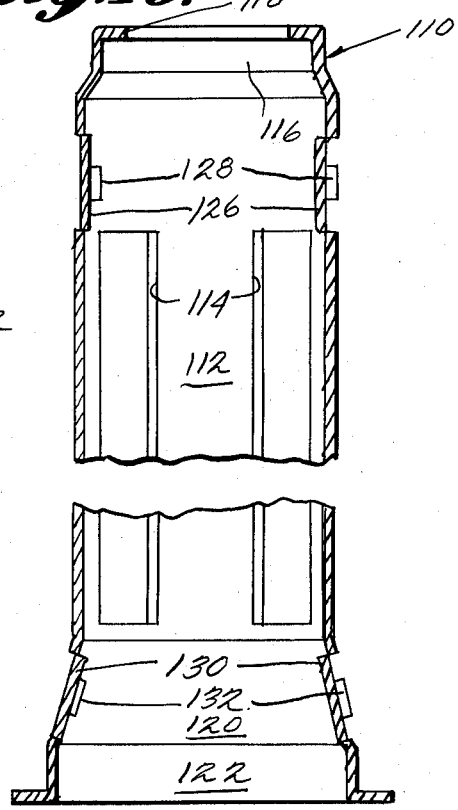
INVENTOR
SELLERS B. McNALLY
BY
ATTORNEYS

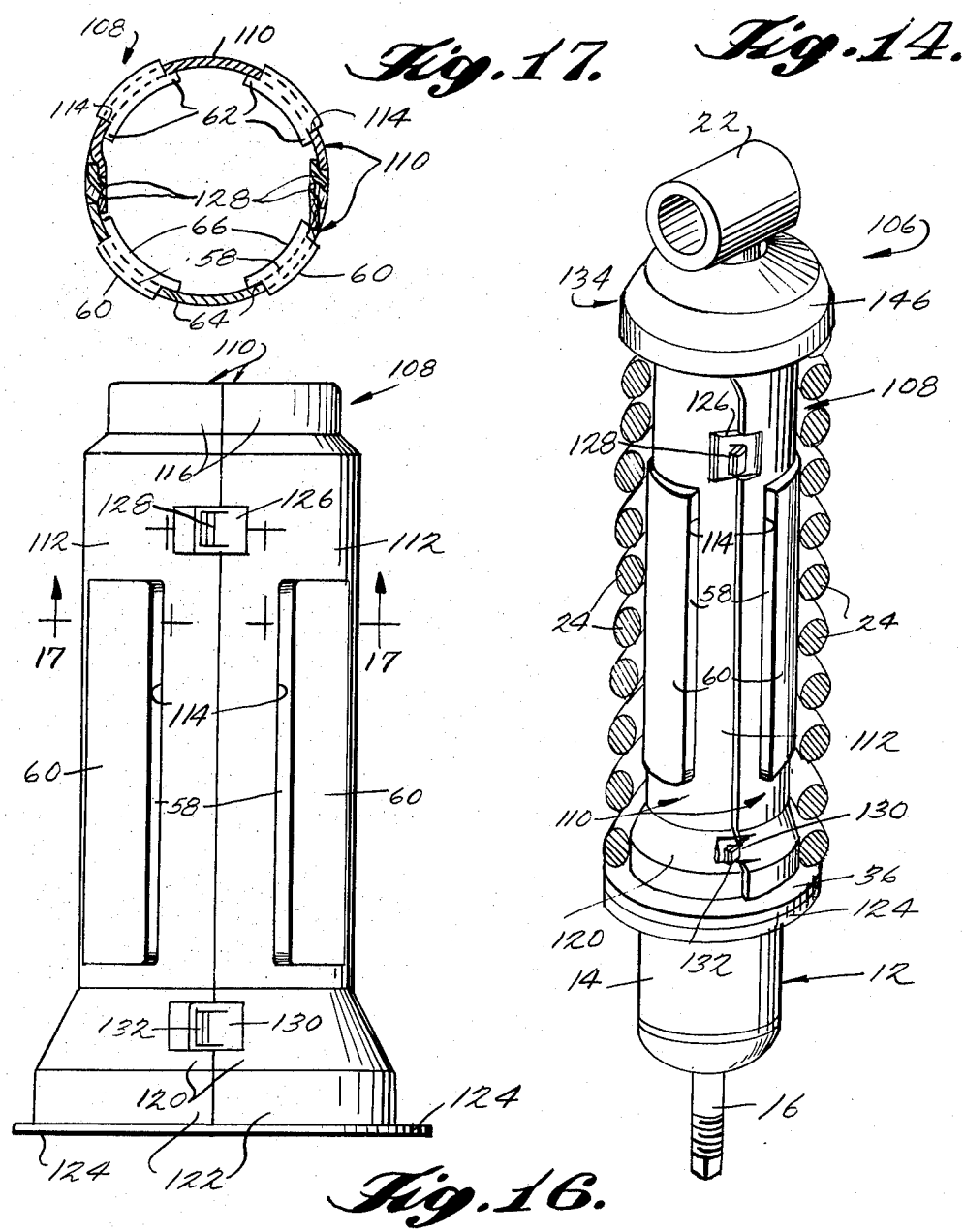

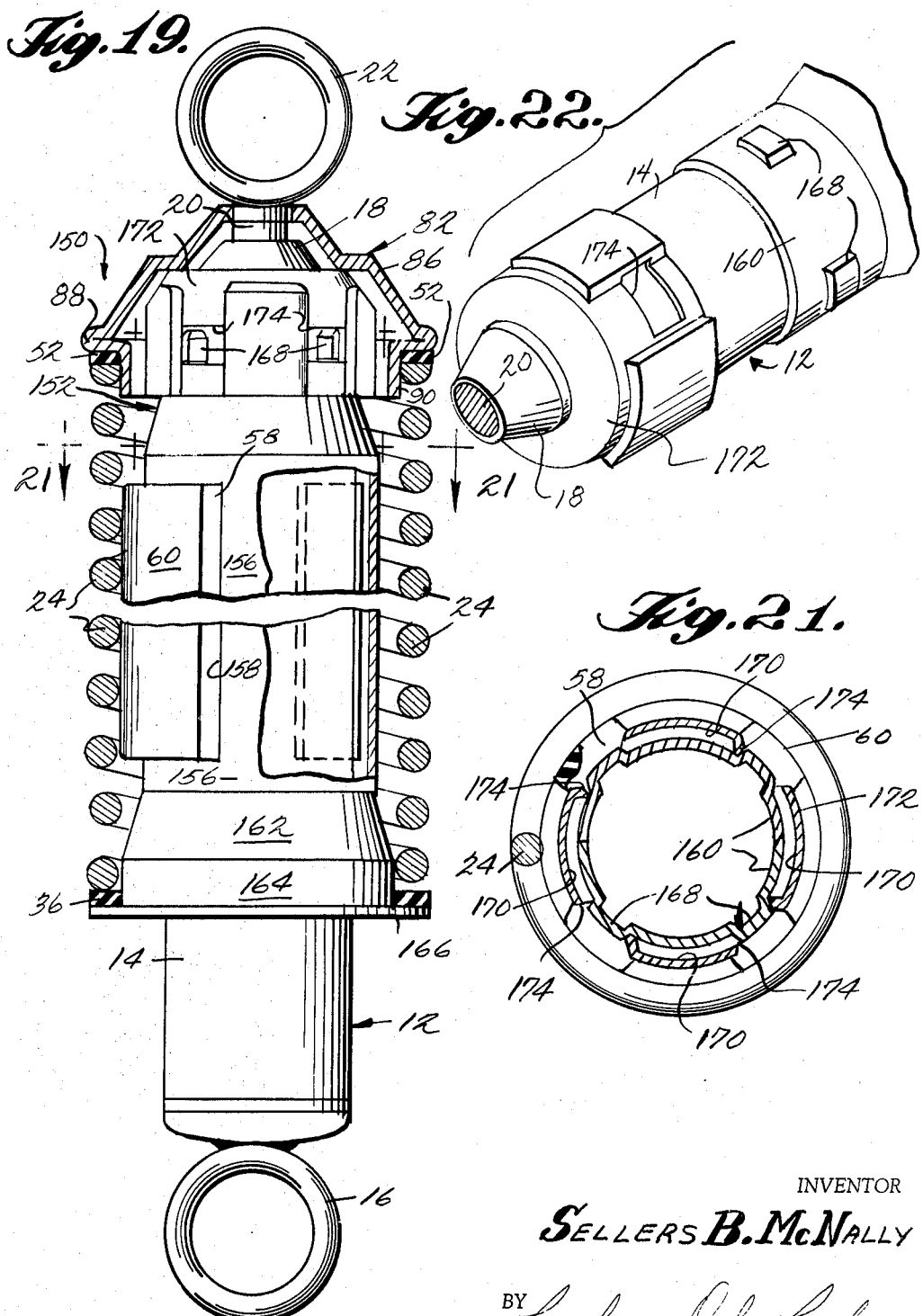

May 17, 1966  S. B. McNALLY  3,251,591
COMBINED ASSIST SPRING AND SHOCK ABSORBER UNIT
Filed May 18, 1964  7 Sheets-Sheet 7
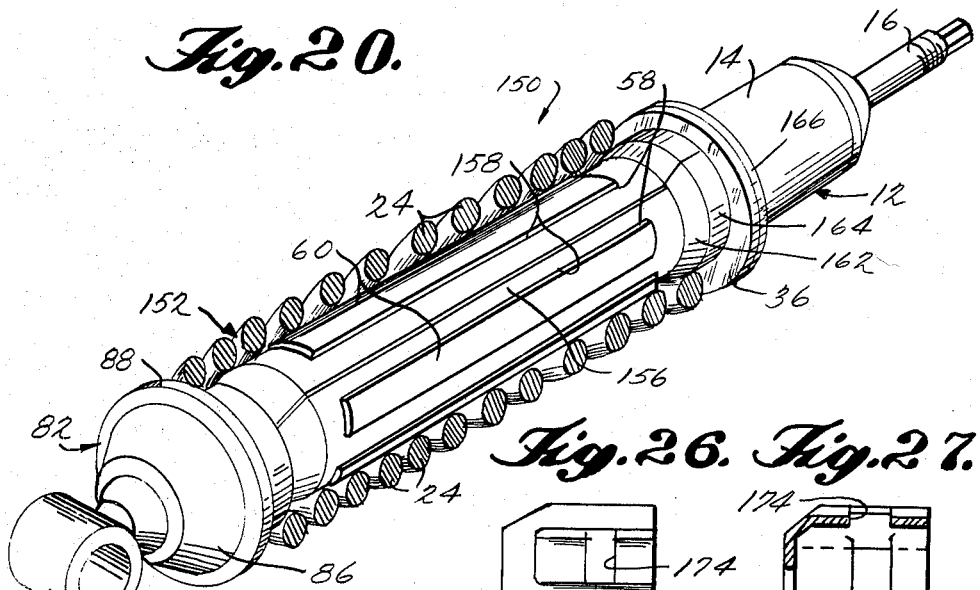
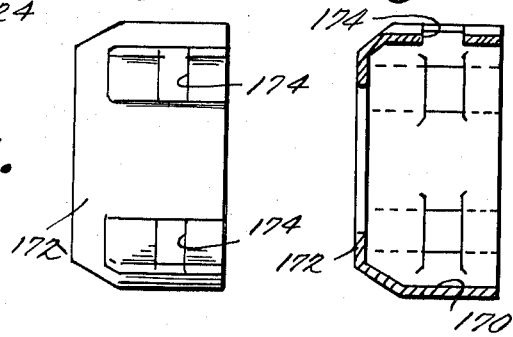
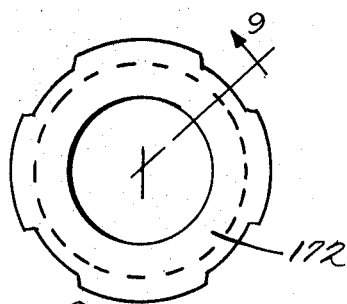
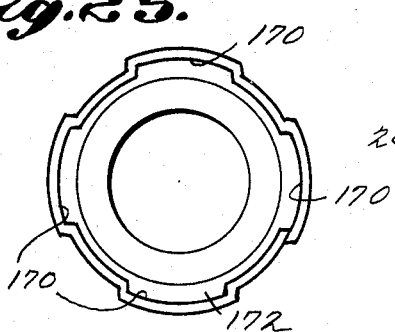
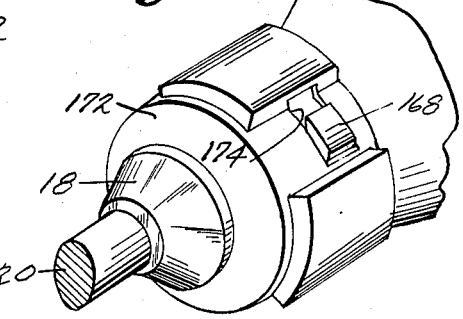
INVENTOR
SELLERS B. McNALLY
BY Cushman, Darby & Cushman
ATTORNEY United States Patent Office 3,251,591
Patented May 17, 1966

3,251,591
COMBINED ASSIST SPRING AND SHOCK
ABSORBER UNIT
Sellers B. McNally, Chesterland, Ohio, assignor to Maremont Corporation, Chicago, Ill., a corporation of Illinois
Filed May 18, 1964, Ser. No. 368,279
11 Claims. (Cl. 267—8)

This invention relates to vehicle suspensions and more particularly to improvements in a combined assist spring and shock absorber unit.

With the advent of the soft "baby carriage" ride in passenger vehicles some six to eight years ago, the need was created for an auxiliary spring to assist in maintaining the vehicle frame at a proper level when unusual loads were applied to the vehicle. One of the biggest problems presented by excessive loads supplied to the rear of a vehicle results from the fact that the vehicle frame is thereby disposed at an angle which directs the headlights upwardly so that, during night travel, even the dim lights are directed into the eyes of motorists traveling in the opposite direction, thus presenting a dangerous situation.

For these and other reasons, combined assist spring and shock absorber units have achieved over the past few years a certain degree of commercial acceptance. In general such units embody a conventional piston and cylinder type shock absorber, a coil spring connected between the telescoping parts of the shock absorber and a spacer assembly between the interior periphery of the coil spring and the outer periphery of the shock absorber for the purpose of maintaining the coil spring in spaced relation to the shock absorber and preventing metal-to-metal contact during operation.

Conventionally, the spacer assembly of a combined assist spring and shock absorber unit consists in a simple sleeve of non-metallic material, such as plastic or the like, which is fitted over the outer tubular member of the shock absorber.

A simple plastic sleeve type spacer provides, of course, a very desirable economy. However, there are presented certain difficulties, both with respect to assembly and operation, by such spacers. First, it will be understood that in operation a shock absorber, by its very nature, generates a considerable amount of heat. Thus, if the spacer is mounted on the shock absorber solely by frictional engagement the effects of the expansion of the plastic sleeve because of the variations in heat during operation may result in the sleeve becoming loose. Moreover, because of the necessity to initially secure the sleeve on the shock absorber so that such loosening is minimized, the actual mounting of the sleeve on the shock absorber has become a somewhat difficult operation.

An object of the present invention is the provision of a combined assist spring and shock absorber unit of the type described having an improved spacer assembly which is simple to install on the shock absorber and effective in operation.

Another object of the present invention is the provision of an assist spring and shock absorber unit of the type described having an improved spacer assembly, which assembly embodies means for receiving and supporting one of the ends of the coil spring with respect to one of the shock absorber parts.

These and other objects of the present invention will become more apparent during the course of the following detailed description and appended claims.

The invention may best be understood with reference to the accompanying drawings wherein illustrative embodiments are shown.

In the drawings:

FIGURE 1 is an elevational view, partly in section, of a combined assist spring and shock absorber unit embodying the principles of the present invention;

FIGURE 2 is a sectional view taken along the line 2—2 of FIGURE 1;

FIGURE 3 is a lay-out view of the pad retainer strap of the spacer assembly;

FIGURE 4 is a sectional view taken along the line 4—4 of FIGURE 3;

FIGURE 5 is an end view of the pad means.

FIGURE 6 is a perspective view, with parts broken away, of the spacer assembly;

FIGURE 7 is a top plan view of the spacer assembly;

FIGURE 8 is a view similar to FIGURE 1 showing a modified form of a combined assist spring and shock absorber unit embodying the principles of the present invention;

FIGURE 9 is a perspective view of the unit shown in FIGURE 8;

FIGURE 10 is a sectional view taken along the line 10—10 of FIGURE 8;

FIGURE 11 is a sectional view taken along the line 11—11 of FIGURE 8;

FIGURE 12 is a sectional view of the spring end retainer member shown in FIGURES 10 and 11;

FIGURE 13 is a view similar to FIGURE 1 of a further modified form of a combined assist spring and shock absorber unit embodying the principles of the present invention;

FIGURE 14 is a perspective view of the unit shown in FIGURE 13;

FIGURE 15 is a sectional view of a spacer shell segment embodied in the unit shown in FIGURES 13 and 14;

FIGURE 16 is an elevational view of the spacer assembly embodied in the unit of FIGURES 13 and 14;

FIGURE 17 is a sectional view taken along the line 17—17 of FIGURE 16;

FIGURE 18 is a sectional view taken along the line 18—18 of FIGURE 13, with parts broken away;

FIGURE 19 is a view similar to FIGURE 1 showing a still further modified form of a combined assist spring and shock absorber unit embodying the principles of the present invention;

FIGURE 20 is a perspective view of the unit shown in FIGURE 19;

FIGURE 21 is a sectional view taken along the line 21—21 of FIGURE 19;

FIGURE 22 is a fragmentary perspective view illustrating the manner in which the shell segments are inserted in the segmented retaining member;

FIGURE 23 is a view similar to FIGURE 22 showing the shell segment in operative retained position;

FIGURE 24 is a top plan view of the shell segment retaining member;

FIGURE 25 is a bottom plan view of the member shown in FIGURE 24;

FIGURE 26 is a side elevational view of the member shown in FIGURE 24; and

FIGURE 27 is a cross-sectional view taken along the line 27—27 of FIGURE 24.

Referring now more particularly to FIGURES 1-7, there is shown therein a preferred embodiment of a combined assist spring and shock absorber unit, generally indicated at 10, which embodies the principles of the present invention. The unit 10 includes a conventional shock absorber unit 12 which may be of any suitable construction. Examples of shock absorber units which may be employed are illustrated in Patents 2,507,267 and 2,788,092. The interior working parts of the shock absorber thus may be of any well-known construction.

Insofar as the present unit is concerned, it is important to note that the shock absorber includes an outer tubular member 14 having a connector 16 secured to the outer end thereof which, as shown in FIGURE 1, is in the form of an eye connector. It will be understood, however, that a stem connector may be utilized where desired. At the opposite end of the outer tubular member 14 there is provided a closure member 18 having a central opening through which a piston rod 20 extends for relative telescopic or reciprocating movement with respect thereto. On the outer end of the piston rod 20 there is provided a connector 22 which, as shown, is likewise of the eye type and, here again, it will be understood that a stem type connector may be utilized where desired.

The unit 10 also includes a coil spring 24 which also may be of any desired construction. For example, the coil spring may be of a fixed pitch or may be of variable pitch, or may include a portion which has a fixed pitch and another portion which has a variable pitch. Moreover, it will be understood that while a single coil spring 24 is shown in the drawings, the present invention clearly contemplates the utilization of more than one spring mounted in axial alignment.

The coil spring 24 is connected between the telescoping parts of the shock absorber 12 defined by the piston rod 20 and the outer tubular member 14. To this end, there is provided a pair of upper and lower spring end connector assemblies, generally indicated at 26 and 28. The lower spring end connector assembly 28 is a fixed assembly and comprises a rigid annular member 30 defining an axially extending sleeve portion 32 at its inner periphery which is fixedly secured to the outer periphery of the outer tubular member 14, as by welding or the like. The annular member 30 also provides a radially extending annular flange portion 34 at its outer periphery which receives a washer member 36 of any suitable material, such as rubber or the like, so as to provide a cushion for receiving the lower end of the coil spring 24.

As best shown in FIGURES 1 and 2, the upper spring end connector assembly 26 is a detachable assembly and includes a generally cup-shaped annular member 38 having a central opening which receives the outer extremity of the piston rod, the central portion of the member 38 being rigidly secured to the piston rod 20, as by welding or the like. The outer periphery of the annular member 38 defines a downwardly projecting annular rim 40, which is of a size less than the interior peripheral size of the coil spring so as to permit the latter to be mounted in surrounding relation to the outer tubular shock absorber member 14 by an axial movement thereby.

The connector assembly 28 also includes a member 42 which is of arcuate configuration of an extent somewhat less than 360° so as to provide opposed free end portions 44 which are spaced apart a distance greater than the diameter size of the piston rod so as to permit the member 42 to be moved laterally into a position between the annular rim 40 and the adjacent end of the spring 24 after the latter has been moved over the outer tubular member 14 with its opposite end in engagement with the washer 36.

It will be noted that the member 42 has an arcuate outwardly facing groove 46 formed in the outer end thereof of a size to receive the outer end portion of the annular rim 40. At the opposite end of the member 42 there is provided a longitudinally extending sleeve portion 48, the outer periphery of which is of a size to receive the inner periphery of the coil spring. The member 42 also includes a radially extending arcuate abutment surface 50 which faces in a direction opposite to that of the arcuate groove 46 and is adapted to receive an annular washer 52 which is initially assembled over the member 38 with the coil spring 24. It will be understood that the washer 52 provides a cushion between the abutment surface 50 of the member 42 and the adjacent end of the spring 24.

The specific structure thus far recited is generally of a conventional nature and the improvements embodying the present invention in the unit 10 shown in FIGURES 1–7 relate specifically to the construction of a spacer assembly, generally indicated at 54, which is mounted between the outer tubular member 14 and the coil spring 24.

As shown best in FIGURES 6 and 7, the spacer assembly 54 includes non-metallic pad means, generally indicated at 56, which preferably is constructed of a resilient material, such as rubber or the like, although plastic and other materials may be utilized if desired. As shown in FIGURE 5, the pad means 56 is in the form of an extrusion which provides a plurality of outer pad portions 58, each having an arcuate outer surface 60. Formed on opposite sides of the inner end of each pad portion 58 is a shoulder portion 62 providing outwardly facing arcuate surfaces 64 adjacent each side of each pad portion 58. Each shoulder portion 62 also includes an inner surface 66 which is concavely arcuate for engaging the outer peripheral surface of the outer tubular member 14. Preferably, as shown, the pad means is formed in one extrusion with adjacent shoulder portions being interconnected by straight web portions 68. It will be understood that the entire pad means 56 including the web portions 68 is of a width such that it can be wrapped around the outer periphery of the tubular member 14 with the web portions of the outermost pad portions disposed in abutting or slightly spaced relation with respect to each other. When thus wrapped around the outer periphery of the member 14, pad portions 58 are disposed in equal circumferentially spaced relation.

In order to retain the pad means in engagement around the outer periphery of the member 14, the spacer assembly 54 also includes a pad retainer, generally indicated at 70. As best shown in FIGURES 3 and 4, the pad retainer preferably comprises a strap of sheet steel or other suitable metal or the like 72, having a plurality of elongated parallel openings 74 formed therein of a size to receive the pad portions 58. The strap 72 is formed into a generally arcuate configuration and is of a gage sufficient to permit the same to be curved around the pad means 56 mounted in engagement with the outer periphery of the member 14. If desired, additional elongated openings 75 may be formed in the strap 72 between the pad receiving openings 74, the openings 75 providing ventilation in operation. When so disposed the pad portions 58 of the pad means extend through the openings 74 of the strap 72 and the outwardly facing arcuate surfaces 64 are engaged by the wall portions of the strap 72 adjacent each side of the openings 74, as shown in FIGURE 7.

Any suitable means may be provided for securing the strap 72 in the wrapped around relationship mentioned above. As shown, one edge of the strap is provided with a pair of attaching tabs 76 which are of generally L-shaped configuration in cross-section. At the opposite end of the strap there is provided a pair of slots 78 positioned to receive the tabs 76 when the strap is wrapped around the pad means 56. Preferably, when the tabs 76 are engaged within the slots 78 to retain the strap in wrapped around position, the strap applies a pressure to the pad means which tends to compress the same so that the resiliency of the material tends to retain the tabs 76 within the slots 78. In this way the spacer assembly is easily assembled around the outer periphery of the tubular member 14 without the necessity of obtaining axial access to either end of the shock absorber. Thus, the spacer assembly 54 of the present invention can be assembled after both the annular member 30 and the annular member 38 have been rigidly secured in position and it will be noted that both of these members are of such size as to prevent axial access to the portion of the outer tubular member disposed therebetween by means of an annular spacer having an interior peripheral size substantially equal to the outer peripheral size of the outer tubular member.

It will be understood, however, that the spacer assembly 54 is installed on the outer tubular member prior to the insertion of the spring 24 into its position surrounding the same. After the spacer assembly has been installed on the outer tubular member, the coil spring 24 with washers 36 and 52 are then moved axially over the piston rod end of the shock absorber until the washer 36 is disposed in engagement with the flange portion 34. Next, the spring is compressed, and the member 42 is moved laterally into a position between the washer 52 and the rim 40 within the groove 46. Next the washer 52 is engaged with the abutment surface 50 and the compression of the spring 24 is relaxed to complete the assembly.

Referring now more particularly to FIGURES 8–12, there is shown therein a modified form of a combined assist spring and shock absorber unit, generally indicated at 80, embodying the principles of the present invention. The unit 80 is similar to the unit 10 previously described except for the spring end connector assemblies. With the unit 10, the spring is assembled by axial movement over the piston rod end of the unit. Assembly of the spring in the unit 80 is accomplished by an axial movement over the cylinder end of the shock absorber. To this end, the unit 80 includes a fixed upper spring end connector assembly 82 which is utilized in lieu of the upper detachable spring end connector assembly 26 and a lower detachable spring end connector assembly 84 which is utilized in lieu of the fixed lower spring end connector assembly 28.

As shown, the assembly 82 comprises an annular member 86 which is apertured at its central portion to receive the upper extremity of the piston rod 20 and, as before, the member is fixed to the piston rod, by any suitable means, such as welding or the like. The outer portion of the member 86 is formed to provide an intermediate annular flange portion 88 providing a downwardly facing annular surface for receiving the washer 52 and a lower sleeve portion 90 of a size to engage within the washer 52 and the adjacent end of the spring 24.

As best shown in FIGURES 10–12, the lower spring end connector assembly 84 comprises an inner annular member 92 having a sleeve portion 94 adjacent its inner periphery which is fixedly secured to the outer periphery of the tubular member 14 as by welding or the like. Formed on the outer periphery of the annular member 92 is a plurality of circumferentially spaced radially extending lugs 96, the exterior periphery of the lugs being of a size less than the interior peripheral size of the spring 24. The assembly 82 also includes an outer annular member 98 which is generally in the form of a sleeve having a plurality of circumferentially spaced longitudinally extending slots 100 formed on the interior periphery thereof, the slots corresponding in number to the lugs 96 and being of a size to receive the same therethrough. Also formed in the interior periphery of the annular member 98 at circumferentially spaced positions disposed between the slots adjacent the lower end of the member is a plurality of arcuate grooves 102, the grooves also being of a size to receive the lugs 96. The outer periphery of the annular member 98 is of a size to receive the washer 36 and adjacent end of the spring 24 and an annular flange 104 extends radially outwardly from the lower end thereof, which flange provides an upwardly facing surface for receiving the washer 36.

In assembling the unit 80, the spacer assembly is first installed around the outer tubular member 14 between the annular member 92 and the inner end of the tubular member. Next, the spring 24 is moved axially upwardly until the washer 52 engages the downwardly facing surface of the flange portion 88. Next the spring is compressed and the outer member 98 is moved axially over the lower end of the tubular member 14 and past the lugs 96 by registering the latter with the slots 100. Finally, the member 98 is rotated about its axis until the lugs register with the grooves 102 and the member 98 is then moved axially so that the lugs engage within the grooves. The compression of the spring 24 is released to complete the assembly.

Referring now more particularly to FIGURES 13–18, there is shown therein a further modified form of an assist spring and shock absorber unit, generally indicated at 106, which includes a conventional shock absorber 12 and coil spring 24 similar to that previously described. Unlike the unit 10 which embodies a fixed lower spring end connector assembly 28 and a separate spacer assembly 54, the unit 106 includes a combined spacer and lower spring end connector assembly, generally indicated at 108. As before, the assembly 108 includes pad means which is the same as the pad means 56 previously described except that the pad portions are separate instead of being joined in one extrusion.

The means for retaining the pad means in engagement with the exterior periphery of the outer tubular member 14 is preferably in the form of a pair of cooperating half shell segments 110 of identical construction. As best shown in FIGURES 15–17, each shell segment includes a central semi-cylindrical portion 112 having a pair of arcuately spaced elongated openings 114 formed therein of a size to receive therethrough a pad portion 58 of the pad means. At one end of the semi-cylindrical portion 112, the segment necks down to a semi-circular sleeve portion 116 which is of a size to engage the exterior periphery of the outer tubular member 14 adjacent its inner end. At the outer extremity of the semi-circular sleeve portion 116, the shell is bent inwardly to form a radially extending flange 118 which is adapted to engage the inner end of the tubular member 14.

At the opposite end of each semi-cylindrical portion 112, the shell segment diverges outwardly into a semi-frusto-conical portion 120. The outer periphery of the frusto-conical portion 120 is integrally connected with the inner end of a semi-circular sleeve portion 122, the outer end of which is bent to form a radially outwardly extending arcuate flange 124.

It will be understood that the shell segments 110 are arranged to be brought together by a relative transverse movement toward each other. In order to maintain the shell segments in operative relation with respect to each other, there is provided a pair of upper tabs 126 which are struck from and extend outwardly from the semi-circular portion 112 adjacent the sleeve portion 116 and the semi-frusto-conical portion 120. Each tab is formed with a generally U-shaped slot defining an outwardly bent locking tongue 128.

Each shell segment 110 also includes a pair of lower tabs 130 located axially in co-extensive relation to the upper tabs 126 and radially in a position to abut the tabs 126 in side-by-side relation. Each of the tabs 130 includes an inwardly bent locking tongue 132 similar to the locking tongue 128 previously described. It will be noted that the locking tongues 132 of each shell segment 110 interengage with the locking tongues 128 of the other shell segment when the two segments are moved together into operative position. The interengagement of the locking tongues, as shown in FIGURE 17, serves to retain the shell segments in operative position with the pad means engaging the outer periphery of the tubular member 14 and extending outwardly of the openings 114.

Preferably, the combined spacer and lower spring and connector assembly 108 is assembled on the outer tubular member 14 before the coil spring is mounted thereover. In this regard, it will be noted that the shell segments could be made integral and such a construction is within the scope of the present invention, although the segmented construction is preferred because of the simplicity in mounting the assembly on the outer tubular member 14.

Since the assembly 108 is effectively a fixed assembly, like the lower spring end connected assemblies 28 of the unit 10, the upper spring end connector assembly is a detachable one similar to the detachable assembly 26 of the unit 10. However, a modified form is shown in connection with the unit 106 and is designated generally by the numeral 134.

As shown, the upper end connector assembly 134 includes a small downwardly concave generally frusto-conical shaped disc member 136 which is fixedly connected at its central portion, as by welding or the like, to the upper end of the piston rod 20. The lower outer peripheral surface of the disc member is adapted to engage within a central groove 138 formed in an arcuate member 140, similar to the arcuate member 42. The member 140 also includes a lower cylindrical skirt portion 142 having a shoulder portion 144 extending radially outwardly from the inner end thereof.

It will be understood that the arcuate member 140 operates in the assembly of the unit 106 in a manner similar to the arcuate member 42 previously described. However, instead of the simple disc washer 52, there is provided a cap-like member 146 which is made of any suitable sealing material, such as rubber or the like. The member 146 includes a main body portion which is of a shape to generally conform with the exterior configuration of the arcuate member 140 and includes an annular flange portion 148 adapted to engage the shoulder portion 144 and to serve the same function as the washer 52 previously described.

It will be understood that in assembling the unit 106, the member 146 is engaged over the member 140 after the latter has been moved laterally into its operative position but before the spring is released from its compressed condition. Once the member 146 is in place with the flange portion 148 engaged below the shoulder portion 144, the release of the spring will simply engage the upper end thereof with the flange portion 148.

Referring now more particularly to FIGURES 19–27, there is shown therein a still further modified form of an assist spring and shock absorber unit, generally indicated at 150, which likewise includes a conventional shock absorber 12 and a coil spring 24 similar to that previously described. The unit 150 is similar to the unit 106 in that it includes a combined spacer and lower spring end connector assembly, generally indicated at 152. This combined assembly 152 is detachable in a manner generally similar to the lower detachable spring end connector assembly 84 of the unit 80 previously described. Thus, the unit 150 includes a fixed upper spring end connector assembly which is identical to the assembly 82 of the unit 80 and is therefore designated by the same numeral.

The lower detachable combined spacer and spring end connector assembly 152 comprises pad means and a pair of cooperating half shell segments 154, of identical construction, generally similar to the half shell segments 110 previously described. As shown, each shell segment includes a central semi-cylindrical portion 156 having a pair of arcuately spaced elongated openings 158 formed therein of a size to receive therethrough a pad portion 58 of the pad means. At one end of the semi-cylindrical portion 156, the segment necks down to a semi-circular sleeve portion 160 which is of a size to engage the exterior periphery of the outer tubular member 14 adjacent its inner end.

At the opposite end of each semi-cylindrical portion 156, the shell segment diverges outwardly into a semi-frusto-conical portion 162. The outer periphery of the frusto-conical portion 162 is integrally connected with the inner end of a semi-circular sleeve portion 164, the outer end of which is bent to form a radially outwardly extending arcuate flange 166.

Formed in the inner semi-circular sleeve portion 160 is a pair of arcuately spaced longitudinally extending lugs 168 which are preferably formed by being struck from the metal forming the sleeve portion 160.

As best shown in FIGURES 22 and 23, the lugs 168 of each shell segment 154 are adapted to be inserted within corresponding longitudinally extending grooves 170 formed in the skirt of a cap member 172 which is engaged on the inner end of the outer tubular member 14 of the shock absorber. The portions of the cap member disposed between the grooves 170 are formed with openings 174 of a size to receive the lugs 68.

The unit 150 is assembled in a manner similar to the unit 80 previously described. Briefly, it will be noted that after the spring has been inserted over the lower end of the shock absorber and compressed, the two shell segments 154, with the pad means properly positioned therein, are moved upwardly until the lugs 168 engage within the grooves 170, as shown in FIGURE 22. The shell segments are then turned approximately 90° to engage the lugs within the openings 174, as shown in FIGURE 23. When the compression of the spring is released the washer will engage the flange 168 to support the lower end of the spring.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:

1. In a combined assist spring and shock absorber unit of the type including a pair of relatively movable telescoping parts, means at the outer ends of said parts for attaching the same to a vehicle or the like, one of said telescoping parts including an outer tubular member longitudinally outwardly fixed with respect to the associated attaching means thereof, a spacer assembly mounted on the exterior periphery of said outer tubular member, and coil spring means mounted in surrounding relation to said spacer assembly and having the ends thereof longitudinally outwardly fixed with respect to said attaching means respectively, the improvement which comprises said spacer assembly comprising resilient pad means movable into engagement with the exterior periphery of said outer tubular member by a movement including a radially inward component, said pad means including a plurality of circumferentially spaced longitudinally extending outer pad portions having outer surfaces disposed generally in a cylindrical plane of a size less than the interior size of said coil spring means, said pad means providing outwardly facing surfaces disposed on opposite sides of each of said outer pad portions generally in a cylindrical plane of a size less than the size of the cylindrical plane of said outer pad portion surfaces and greater than the size of said outer tubular member, pad retaining means movable from a receiving position into a pad retaining position by a movement including a radially inward component, and means for securing said pad retaining means in said pad retaining position, said pad retaining means in said pad retaining position including metallic wall portions engaging the outwardly facing surfaces of said pad means and having openings therein of a size to receive said outer pad portions, said outer pad portions extending outwardly of said openings.

2. The improvement as defined in claim 1 wherein said pad retaining means comprises a metal strap of a size and shape to be wrapped around said outer tubular member in engagement with the outwardly facing surfaces of said pad means.

3. The improvement as defined in claim 2 wherein said means for securing said pad retaining means in said pad retaining position comprises attaching tabs formed on one longitudinal edge of said metal strap, said metal strap having openings formed therein adjacent the opposite longitudinal edge thereof for receiving said attaching tabs.

4. The improvement as defined in claim 2 wherein said metal strap includes ventilating openings between said pad portion receiving openings.

5. The improvement as defined in claim 2 wherein said pad means comprises a single strip of resilient material having thin web portions interconnecting adjacent pad portions between adjacent outwardly facing surfaces.

6. The improvement as defined in claim 1 wherein the ends of said spring means are longitudinally outwardly fixed with respect to said attaching means by means of a pair of spring end connector assemblies, one of said assemblies being longitudinally outwardly fixedly secured to one of said telescoping parts to support one end of said spring means, the other of said assemblies being mounted on the other of said telescoping parts for movement between an inoperative position permitting said spring means to be moved longitudinally over said other telescoping part to engage said one end thereof with said one assembly and an operative position engaging the other end of said spring means and longitudinally outwardly fixed with respect to said other telescoping part.

7. The improvement as defined in claim 6 wherein said other spring end connector assembly comprises a first annular member fixedly secured to the outer periphery of said outer tubular member, said first annular member having a plurality of circumferentially spaced lugs extending outwardly therefrom, and a second annular member having a central opening of a size to receive said first annular member therethrough, said opening having a plurality of circumferentially spaced longitudinally extending slots formed therein of a size to receive said lugs therethrough and a corresponding plurality of longitudinally outwardly facing grooves of a size to receive said lugs therein positioned between said slots.

8. In a combined assist spring and shock absorber unit of the type including a pair of relatively movable telescoping parts, means at the outer ends of said parts for attaching the same to a vehicle or the like, one of said telescoping parts including an outer tubular member longitudinally outwardly fixed with respect to the associated attaching means thereof, a spacer assembly mounted on the exterior periphery of said outer tubular member, and coil spring means mounted in surrounding relation to said spacer assembly and having the ends thereof longitudinally outwardly fixed with respect to said attaching means respectively, the improvement which comprises said spacer assembly comprising metallic sleeve means disposed in surrounding relation to said outer tubular member, means adjacent one end of said sleeve means for engaging the inner end of said outer tubular member and preventing longitudinal outward movement of said sleeve with respect to said outer tubular member, means extending outwardly from the opposite end of said sleeve means for receiving and supporting one end of said coil spring means, and non-metallic pad means including a plurality of circumferentially spaced longitudinally extending outer pad portions having outer surfaces disposed generally in a cylindrical plane of a size less than the interior size of said coil spring means, said pad means providing outwardly facing surfaces disposed on opposite sides of each of said outer pad portions generally in a cylindrical plane of a size less than the size of the cylindrical plane of said outer pad portion surfaces and greater than the size of said outer tubular member, said sleeve means engaging the outwardly facing surfaces of said pad means and having openings therein of a size to receive said outer pad portions, said outer pad portions extending outwardly of said openings.

9. The improvement as defined in claim 8 wherein said sleeve means comprises a pair of substantially identical half shell segments movable transversely together to form an annular shell.

10. The improvement as defined in claim 9 wherein said shell segments include interengaging locking tongues at each longitudinal edge thereof for retaining the same together.

11. The improvement as defined in claim 9 wherein the inner end of each of said shell segments includes a pair of circumferentially spaced lugs, and an annular cap member secured to the inner end of said outer tubular member and having a plurality of circumferentially spaced longitudinally extending grooves of a size to receive said lugs longitudinally therein and an opening communicating laterally with each groove of a size to receive an associated lug and prevent longitudinal outward movement therefrom.

References Cited by the Examiner

UNITED STATES PATENTS

| | | | |
|---|---|---|---|
| 2,874,955 | 2/1959 | McIntyre et al. | 267—8 |
| 2,902,274 | 9/1959 | McIntyre | 267—8 |
| 2,999,678 | 9/1961 | Heckethorn | 267—8 |
| 3,163,411 | 12/1964 | Heckethorn | 267—8 |
| 3,206,184 | 9/1965 | Walker | 267—8 |

ARTHUR L. LA POINT, *Primary Examiner.*

R. M. WOHLFARTH, *Assistant Examiner.*